United States Patent
Krone et al.

(10) Patent No.: US 7,181,898 B2
(45) Date of Patent: Feb. 27, 2007

(54) MACHINE FOR COLLECTING AND PRESSING AN AGRICULTURAL HARVEST

(75) Inventors: Bernard Krone, Spelle (DE); Klaus Martensen, Hörstel (DE)

(73) Assignee: Maschinenfabrik Bernard Krone GmbH, Spelle (DE)

( * ) Notice: Subject to any disclaimer, the term of this patent is extended or adjusted under 35 U.S.C. 154(b) by 17 days.

(21) Appl. No.: 10/908,385

(22) Filed: May 10, 2005

(65) Prior Publication Data

US 2005/0252388 A1    Nov. 17, 2005

(30) Foreign Application Priority Data

May 11, 2004   (DE) ...................... 10 2004 023 694

(51) Int. Cl.
*A01D 39/00* (2006.01)
*A01D 43/02* (2006.01)
*A01D 75/00* (2006.01)

(52) U.S. Cl. ......................................... 56/341; 100/40
(58) Field of Classification Search ................. 56/341; 100/40, 1–5, 87–88; 53/118, 587
See application file for complete search history.

(56) References Cited

U.S. PATENT DOCUMENTS

| | | | | | |
|---|---|---|---|---|---|
| 4,389,929 A | * | 6/1983 | Kluver et al. | .................. | 100/88 |
| 4,549,480 A | | 10/1985 | DeCoene | ...................... | 100/88 |
| 4,550,557 A | * | 11/1985 | Vissers et al. | ................. | 56/341 |
| 5,638,749 A | * | 6/1997 | Ansbjer et al. | ............... | 100/87 |
| 6,079,324 A | * | 6/2000 | Feraboli et al. | ............... | 100/40 |

* cited by examiner

*Primary Examiner*—Árpád Fábián Kovács
(74) *Attorney, Agent, or Firm*—Gudrun E. Huckett

(57) ABSTRACT

A machine for collecting and pressing a crop to roll-shaped bales has a crop collecting device and a bale-forming device defining a winding chamber arranged downstream of the crop collecting device. At least a first and a second stationary deflection devices are provided, wherein the bale-forming device is guided about the first and second stationary deflection devices. Stationary guides are positioned between the first and second stationary deflection guides. The bale-forming device, during a first bale-forming phase, travels along a spatially determined movement path and is supported on the stationary guides. The bale-forming device is lifted off the stationary guides during a second bale-forming phase. For compressing a bale to be formed after reaching a preset bale diameter, the bale-forming device exerts on the bale to be formed in a compression phase a compression force in a direction from the exterior to the interior of the bale.

19 Claims, 6 Drawing Sheets

MACHINE FOR COLLECTING AND PRESSING AN AGRICULTURAL HARVEST

BACKGROUND OF THE INVENTION

The invention relates to a machine for collecting and pressing an agricultural harvest or crop, for example, grass, hay, straw or the like, to roll-shaped bales. The machine comprises a winding chamber that is transportable on a chassis and can be opened, wherein the winding chamber has a bale-forming device arranged downstream of the crop collecting device and guided across at least a first and a second stationary deflection devices. During a bale-forming phase, the bale-forming device travels within the winding chamber along a spatially determined movement path on guides. For compressing the bale to be formed after reaching a certain bale diameter, the bale-forming device exerts on the bale a compression force in a direction from the exterior to the interior.

In customary configurations, machines of the aforementioned kind for collecting and pressing an agricultural harvest or crop are designed as round balers having a fixed chamber configuration; they have a bale-forming device that during the entire bale-forming phase travels along a spatially determined movement path and, for this purpose, is guided on guides provided on the housing. With such machines, bales of a certain bale diameter can be formed in that harvested material is supplied by means of a crop collecting device to the bale forming chamber and, after filling of the provided bale forming chamber, the bale forming device exerts a compression force in a direction from the exterior to the interior onto the bale to be formed so that this compression phase is carried out subsequent to the preceding crop supply phase and the bale forming phase. With such machines, bales can be formed that, as a result of the bale compression phase provided at the end of the bale forming phase, have a relatively hard external diameter area while they have at the same time a relatively soft bale core. This can have advantages for a subsequent processing of the bale in that the relatively soft bale core can be divided with simple means and also without great force expenditure.

Moreover, it is disclosed, for example, in U.S. Pat. No. 4,549,480, to design machines for collecting and pressing an agricultural harvest as baling presses with a variable size of the winding chamber; in such devices, starting with the initial bale-forming phase, the bale to be formed is guided constantly on the bale-forming device by means of a spatially variably moved bale-forming device so that the bale-forming device, even during the entire filling process of the variable winding chamber, exerts a force onto the bale and a subsequent compression phase is thus not needed. Because compression of the bale is carried out continuously, the bales are ejected at a desired diameter range of the bale in a finished state from the bale-forming chamber; it is therefore possible to produce bales with different diameters and thus with different sizes.

A bale that has been produced on such a variable machine differs however with regard to its configuration, for example, with regard to the stiffness of the bale core, from a bale that has been produced on a machine that operates in accordance with the fixed chamber principle. A bale that has been produced on such a variable machine is therefore different with regard to its break-up properties from a bale that has been produced on a fixed chamber machine. A disadvantage of machines that operate according to the variable bale-forming principle is moreover the high technical expenditure in the form of the constructive means that enable the variability of the bale size and the permanent force action. Moreover, with such machines it is not possible to form bales that have a relatively soft bale core.

SUMMARY OF THE INVENTION

It is an object of the present invention to provide a machine of the aforementioned kind that has a constructively simple bale-forming device but enables at the same time forming of bales of different sizes.

This is achieved in that the machine of the aforementioned kind for collecting and pressing an agricultural harvest or crop is characterized in accordance with the present invention in that the bale-forming device along its spatially determined movement path during a first bale-forming phase is supported on stationary guides positioned between the first and the second deflection devices, wherein the bale-forming device can be lifted off the stationary guides during a subsequent (second) bale-forming phase.

In this way, a machine for collecting and pressing an agricultural harvest or crop is provided in which during the first bale-forming phase the collected harvest can be filled first into the winding chamber while the bale-forming device still moves along a spatially determined movement path and accordingly does not yet exert a compression force onto the filled-in harvest. However, the machine is provided with the constructive prerequisites such that, with increasing quantity of filled-in harvest, the bale-forming device can be lifted off the stationary guides and can be transferred onto movement paths that enable forming of a bale that is greater in comparison to the spatially determined movement path. This can be realized in an adjustable way but, for example, also by means of the bale to be formed itself in that the bale to be formed contacts the bale-forming device and, with increasing bale diameter, the bale-forming device is lifted off the guides of the spatially determined movement path.

All this can be realized with simple constructive and design means. During the lifting phase, it is no longer required that a sidewall of the housing provides a lateral guiding action so as to additionally delimit the bale. Instead, it is also possible to provide by means of a step at the housing that widens the housing outwardly the constructive prerequisites to make available free space above the step; the bale-forming device, after having been lifting off the guides of the stationary or spatially determined movement path, can be moved into this free space above the step at the housing. In this way, in this area a lateral spacing is provided relative to an upper housing sidewall that adjoins the step. The bale-forming device preferably travels across deflection rollers that are stationarily mounted in the step area of the housing wall.

By means of such a machine, conditions are provided that allow the machine to operate like one with a fixed chamber known in the art in that by means of the crop collecting device the crop is introduced relatively loosely into the bale-forming chamber without the crop being subjected already to a force essential for a compression phase by the bale-forming device. During this phase, the bale-forming device, in a way analog to a fixed chamber machine, travels along a spatially determined movement path that is defined constructively by the machine. When doing so, a polygon effect occurs with regard to pre-compression of the harvested material in that during this first bale-forming phase the harvested material is pre-compressed in a pulsating fashion. This can be favorably affected by a polygonal chamber for starting the bale. Only after reaching a bale size that causes the bale to come into contact with the bale-forming device, a further bale-forming phase can follow in which the bale to be formed will rest at all times against the bale-forming device. During this second bale-forming phase that occurs subsequent to the first bale-forming phase, the bale-forming device travels along changing movement paths that change in accordance with the growing bale size up to an area that is preselected by the operator and predetermined by control means. The preselected area therefore determines also the bale diameter of the bale to be formed. When this bale diameter is reached, as in fixed chamber machines, the compression of the outer bale diameter area is carried out in that the bale compression phase is initiated and, accordingly, a bale is to be formed that, for a preset bale diameter, has a relatively soft bale core and a relatively strongly compressed exterior skin.

All of this can be accomplished with constructively relatively simple means so that a machine is made available that, with regard to its functional principle, is a fixed chamber machine but is not limited to a particular bale size. Accordingly, with such a machine bales can be formed having, for example, a size of 100 to 150 cm in diameter. In this connection, the smaller diameter range can be also achieved, for example, in that the additional bale-forming phase with the additional movement paths of the bale-forming device is no longer reached but the control means ensure as a result of the selected position that directly after completion of the first bale-forming phase already the compression phase is carried out. The operator of the machine can therefore use the machine according to the invention also purely as a fixed chamber machine and produce customary bales. Moreover, with simple and operator-friendly means, the operator can also produce, as needed, larger bales wherein for this selected bale-forming process the additional bale-forming phase follows the first bale-forming phase before the compression phase is carried out.

Preferably, the adjusting or control means are stops, limiting elements and the like wherein a limiting element or an abutment can be attached to the housing and another stop element, for example, can be made adjustable in order to realize the selectable diameter range. Alternatively, it is also feasible to provide pneumatic or hydraulic control means with appropriate blocked adjusted positions in order to configure the corresponding stops or abutments with an end position that is adjustable in a simple way. In an especially preferred embodiment of the machine according to the invention, several stationary deflection devices can be provided. Preferably, between a first deflection device and a second defection device in the housing of the machine additional stationary sidewall guides are provided in a lateral hosing area that is expediently vertically designed. This can be realized in that these sidewall sections initially delimit the bale-forming chamber and widen beginning at a certain height and thus have a step that widens the sidewalls laterally to the exterior of the machine. In this area, additional guide rollers can be stationarily supported on which the bale-forming device will be guided for securing a certain movement path within the machine. By the widened section above the guides an evasion space for the bale-forming device is provided so that an evasive movement of the bale-forming device into this space is possible when the additional movement paths of the bale-forming device are to be enabled after reaching or completing the first bale-forming phase. By means of the provided deflection rollers and by means of belts that are preferably provided and are components of the bale-forming device, the operating noise of the bale-forming device is extremely reduced in comparison to conventional machines.

BRIEF DESCRIPTION OF THE DRAWING

Further advantages and configurations of the invention result from the dependent claims, the following description and the drawings.

DESCRIPTION OF THE PREFERRED EMBODIMENTS

Figure 1:
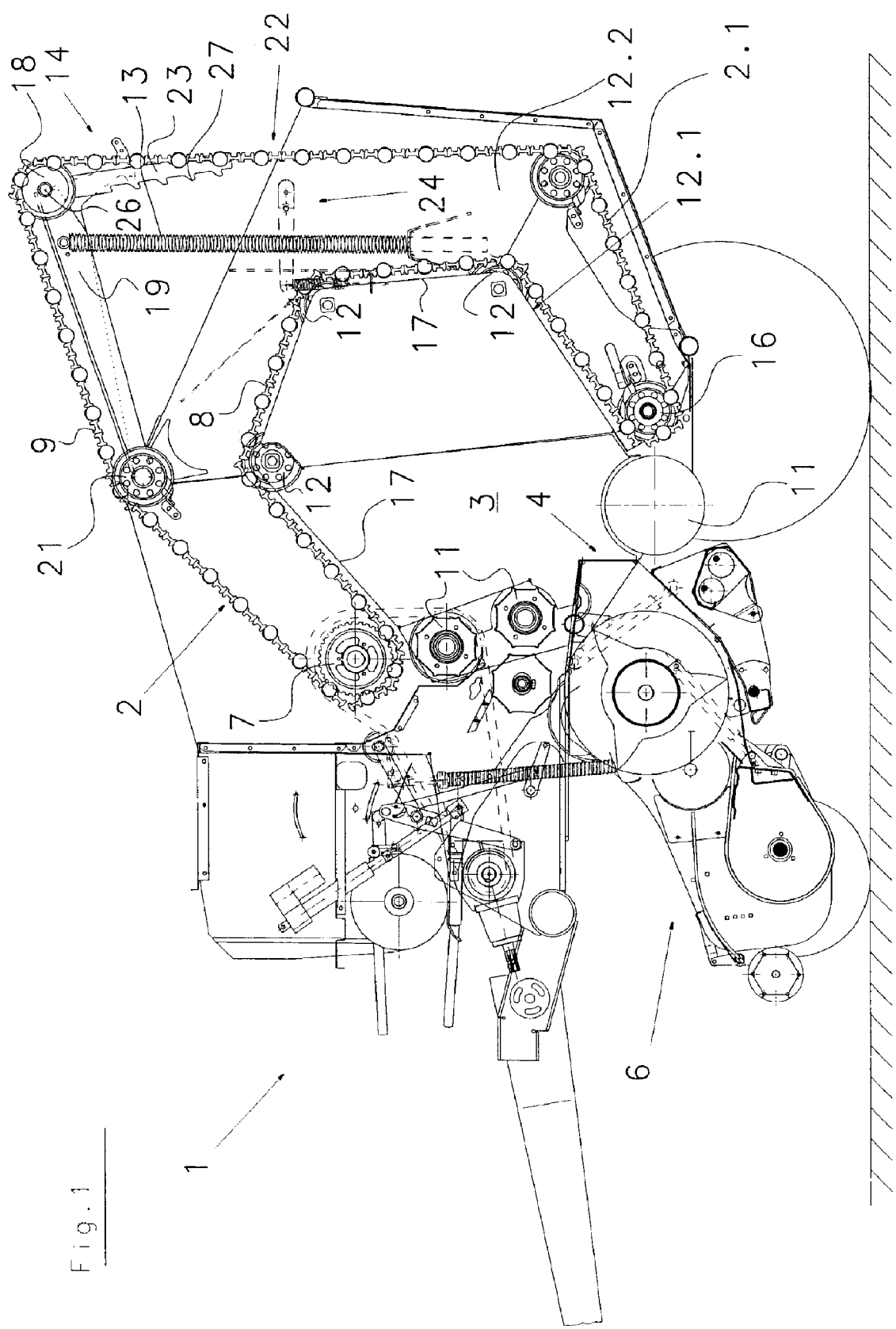
FIG. 1 is a schematic section side view of a machine with illustration of one position of the bale-forming device during the first bale-forming phase.

The drawings show in a few illustrations one side of the machine with the parts provided thereat. It is understood that these parts are present or may be present also on the other machine side that is not illustrated.

The machine 1 in the illustrated embodiment is a round bale press and has a bale-forming device 2 that forms a winding chamber 3. This winding chamber 3 has an intake opening 4 through which the harvested material or crop collected by the crop collecting device 6, for example, hay and silage, is introduced into the winding chamber 3. The drive rollers 7 divide the bale-forming device 2 into a load run and a return run 9. The rollers 11 (conveying elements) of the collecting device that are arranged above and below the opening 4 delimit the winding chamber 3.

Figure 3:
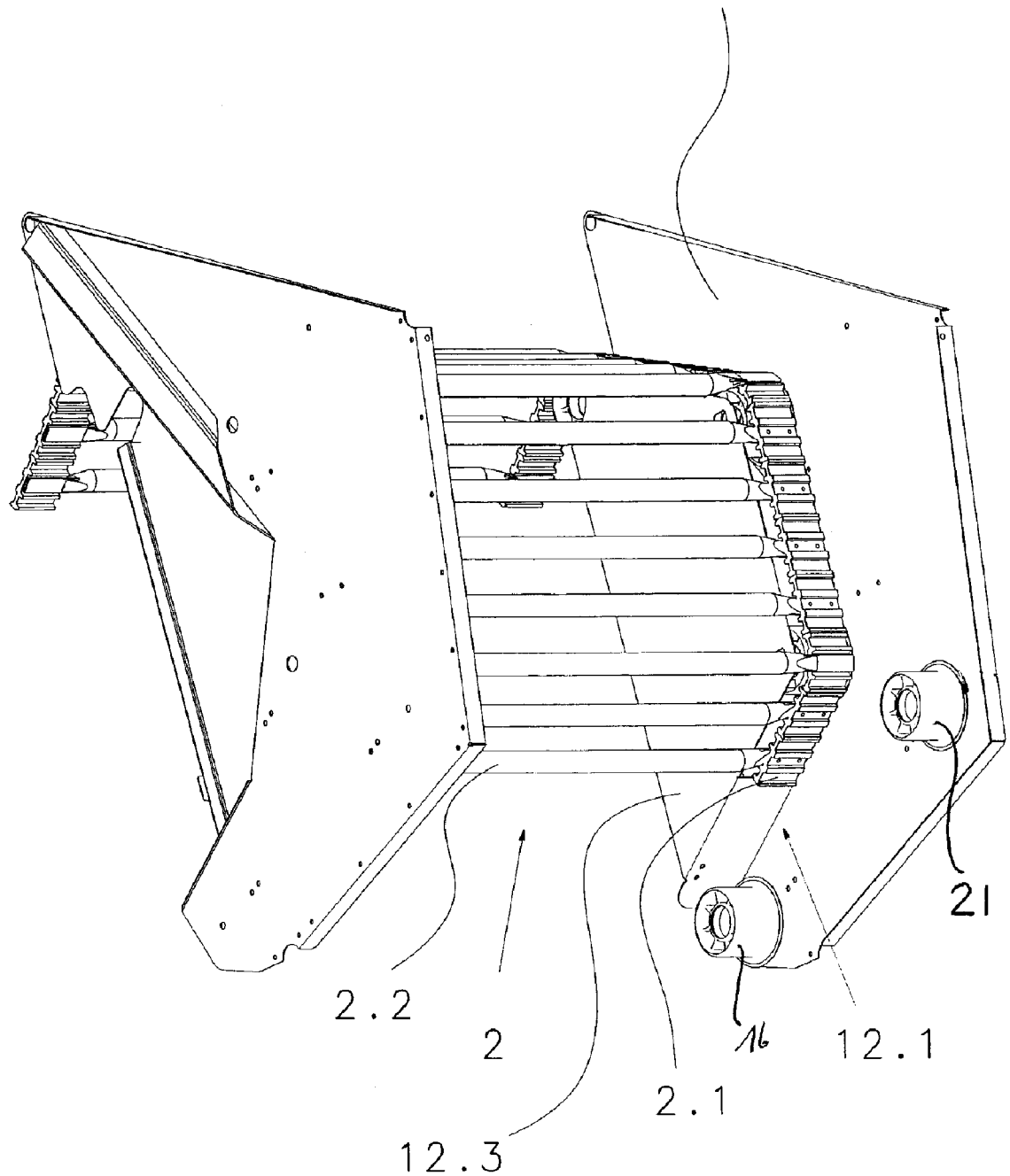
FIG. 3 is a schematic perspective illustration of the bale-forming device that in the illustrated embodiment is guided about deflection rollers and a step at the sidewalls of the housing of the machine and is provided with lateral belts as well as rods (crossbars).

In addition, a first stationary deflection device in the form of deflection rollers 16 as well as a second deflection device in the form of deflection rollers 7 are provided, wherein the deflection rollers 7 are the drive rollers for the bale-forming device 2. In addition, in the illustrated embodiment there are stationarily supported additional deflection rollers 12 that are arranged on a step 12.1 of the sidewall sections 12.2, 12.3 (FIGS. 3 and 4) of the housing of the machine.

Figure 4:
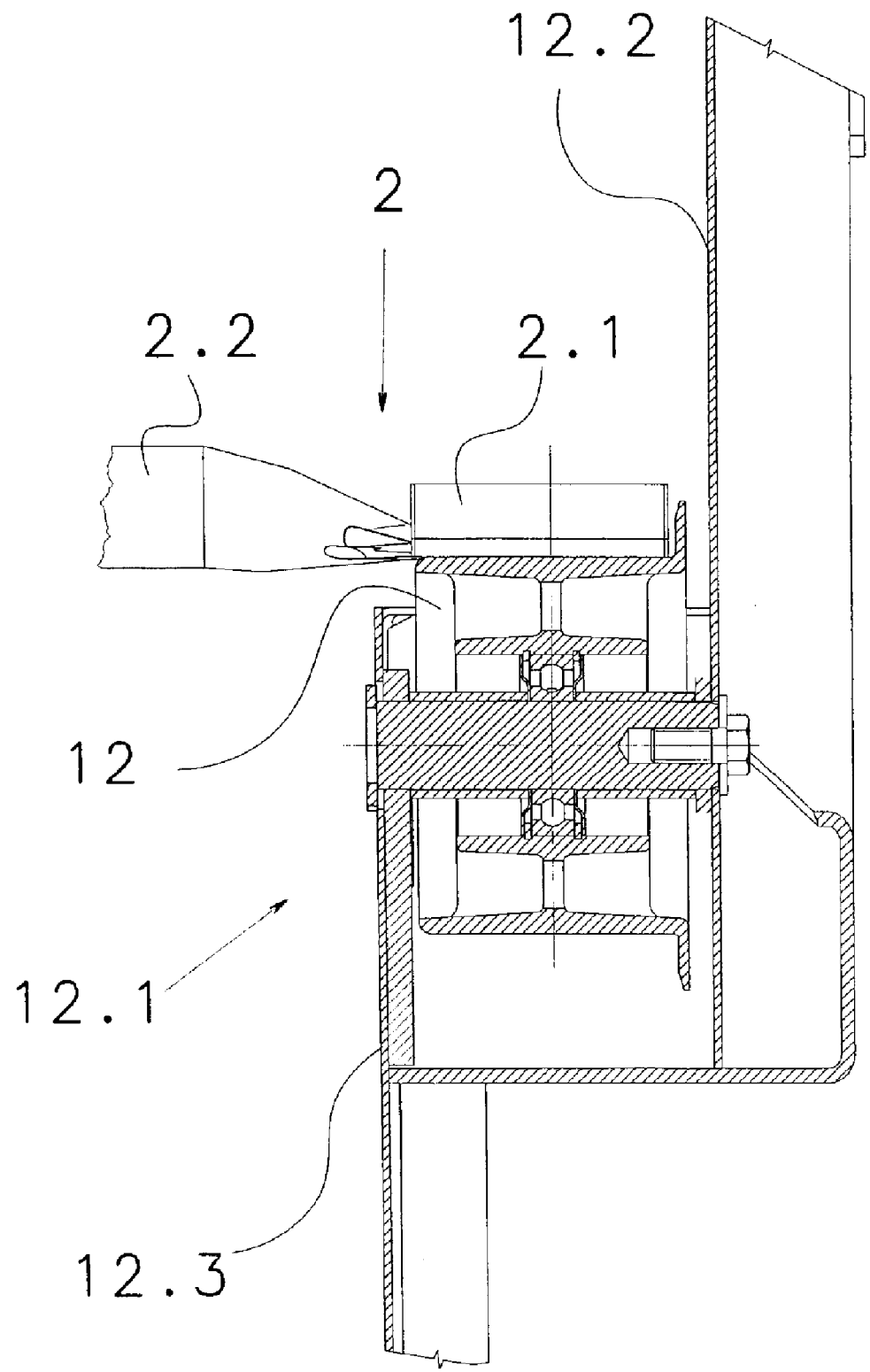
FIG. 4 is a section illustration in the belt and crossbar area of the bale-forming device and of a stationary deflection roller in the stepped housing section illustrated in FIG. 3.

In this area, the housing is therefore widened so that above the guide rollers 12 and the end areas of the rods or crossbars 2.2 and the belts 2.1 for the bale-forming device 2, an empty space is provided into which the bale-forming device 2 can be deflected (upwardly in the illustration according to FIG. 4).

The bale-forming device 2 also has an area that is generally referred to as storage 14 and is supported by a yielding deflection roller 18 supported on a tensioning arm 19. A spring 13 forming a force storage device engages the tensioning arm 19. Accordingly, the bale-forming device 2 can be deflected in this area. When the winding chamber 3 is being filled, an outwardly oriented pressure is exerted onto the load run 8 and the spring 13 is compressed. In this way, the length of the bale-forming device 2 between the deflection rollers 18 and 21 is changed. The growth of the crop bale goes hand in hand with an enlargement of the winding chamber 3. In this way, it is ensured that in such a bale-forming phase, following the first bale-forming phase carried out with a spatially determined movement path of the bale-forming device, no significant pressing force or compression force from the exterior to the interior is exerted onto the growing bale to be formed before carrying out the subsequent compression phase.

Figure 5:
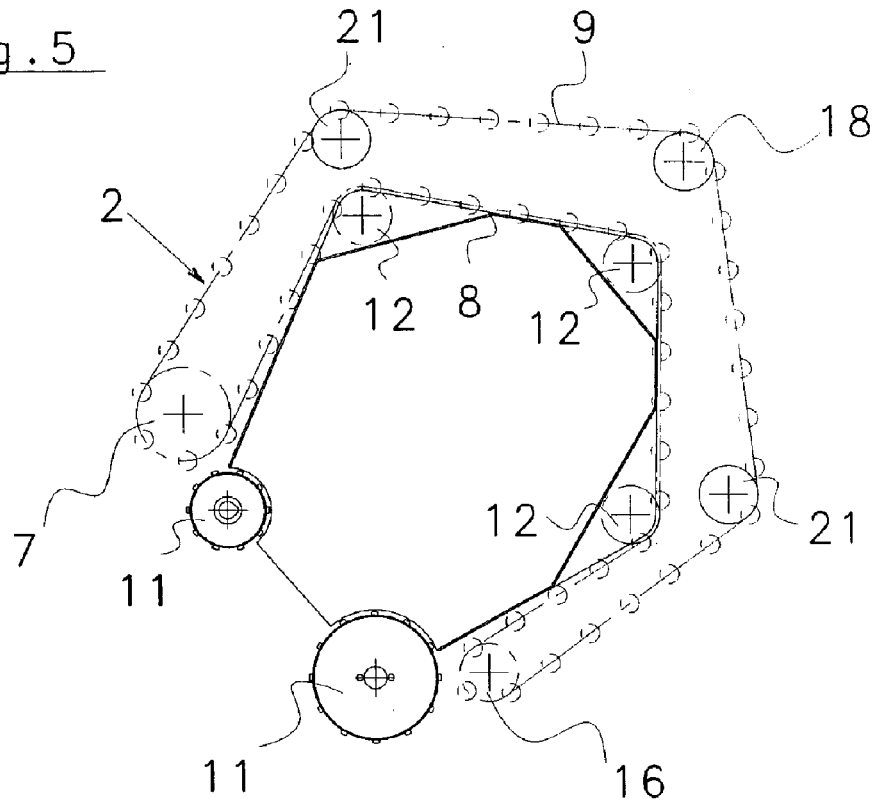
FIG. 5 is a schematic section view of the bale-forming device in the position according to FIG. 1.
Figure 6:
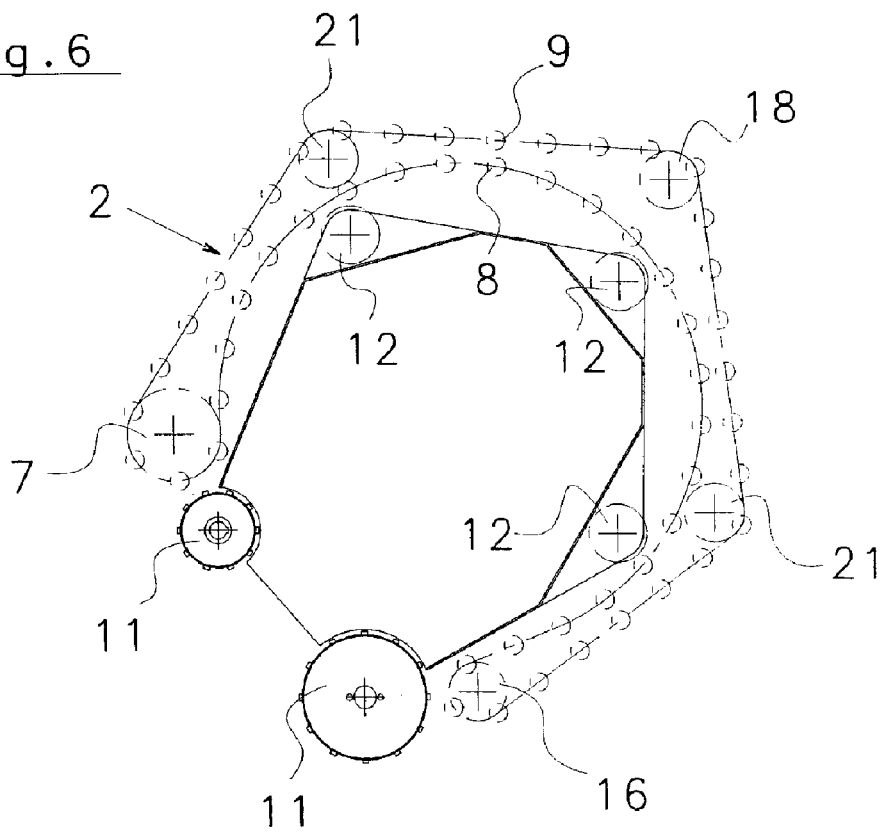
FIG. 6 is a schematic section view of the bale-forming device in the position of FIG. 2.

In operation, harvested material or crop is introduced by the crop collecting device 6 into the winding chamber 3 through an intake opening 4. At the beginning of this bale-forming process, a bale-starting chamber is formed that is delimited by the bale-forming device 2 so as to have a polygonal shape with an upwardly slanted area, a substantially vertical area, and an adjoining area that is also upwardly slanted; this is shown in more detail in FIG. 5. In this way, the bale-starting process is facilitated. During this bale-starting process and also during a defined first bale-forming phase, the bale-forming device 2 is in the position illustrated in FIG. 5 and describes therefore the movement path illustrated therein that remains the same and is thus spatially determined. In this connection, the bale-forming device 2 is guided across the first and second deflection rollers 7 and 16 and the area facing the bale to be formed is guided across the stationary rollers 12 and on the step 12.1 of the sidewall sections 12.2, 12.3 forming sidewall guides. Once the harvested material has filled the initial winding chamber, the bale-forming device 2 can expand by means of its load run 8, wherein, by means of compression of the spring 13 and the yielding of the deflection roller 18 the movement path of the bale-forming device 2 will adjust to the increasing bale size during this subsequent (second) bale-forming phase so that, during this subsequent bale-forming phase, movement phases that are independent of the guide rollers 12 and determined by the diameter of the bale to be formed will result up to the point of reaching the adjustable bale diameter. The outermost movement path that can be achieved with the illustrated embodiment of the machine according to the invention is illustrated in FIG. 2 and in FIG. 6.

Figure 2:
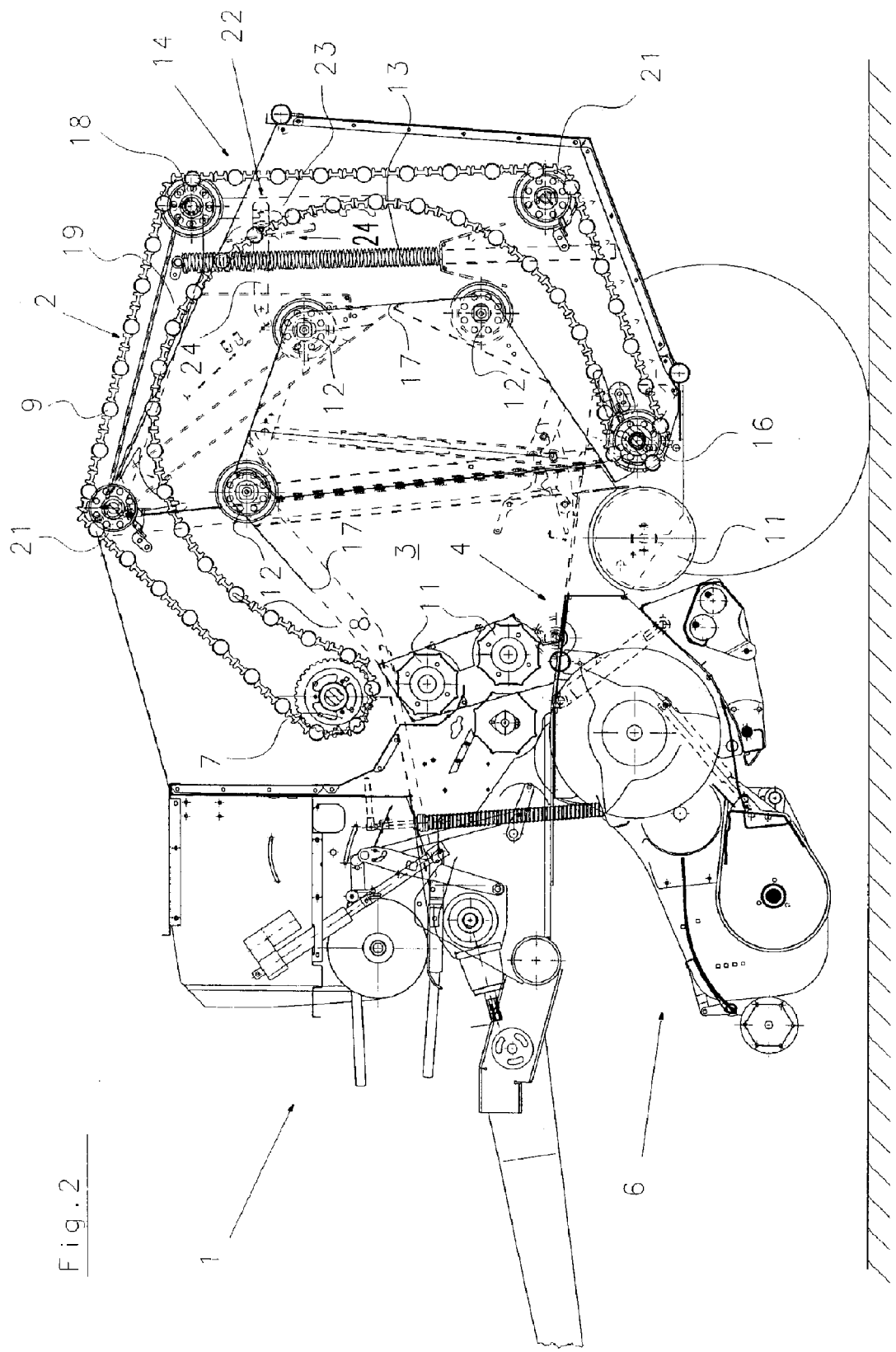
FIG. 2 is an illustration analog to FIG. 1 illustrating the bale-forming device in the end position, i.e., in the compression phase.

The bale to be formed can therefore have a diameter that is variably adjustable between the positions that are variable as needed by the positions of the load run 8 of the bale-forming device 2 (illustrated in FIG. 2). As a result of the yielding support of the deflection roller 18, an excellent contact between the bale-forming device 2 and the crop is present during the further bale-forming phase; however, a significant pressing force is avoided. In this way, the desired goal of being able to provide a relatively loose bale core is realized.

An adjustable limiting device 22 for presetting a diameter of the crop bale is embodied in the illustrated embodiment as a stop member 23 that is movable relative to the tensioning arm 19 and engages an abutment 24 secured on the housing. Depending on the relative position of the stop member 23 to the tensioning arm 19, i.e., depending on the angle that is adjusted between the longitudinal axis of the tensioning arm 19 and the longitudinal axis of the stop member 23, one of the receptacles 27 of the stop member 23 engages the abutment 24 and limits thus the effective length of the bale-forming device 2 that is made available by the storage 14 for enlarging the winding chamber 3. In this way, a very simple device for presetting the diameter of the crop bale is provided. In addition, measuring devices or elements can be provided in order to monitor bale parameters, for example, the compression level of the bale or the pressing force that is being applied.

Advantageously, the deflection roller 18 belonging to the storage 14 is arranged in the travel direction before the rear end of the machine and behind the center of the crop bale being formed. In this way, the machine is of a compact configuration. The force loading of the tensioning arm 19 by the force storage device embodied in the form of the spring 13 is thus approximately at a right angle relative to the tensioning arm 19; this provides favorable leverage and also an excellent transfer of the applied forces. Moreover, the spring 13 engages the tensioning arm 19 in the vicinity of the deflection roller 18 and therefore in an area in which those forces act that are exerted by the bale-forming device 2 onto the tensioning arm 19. The same holds true also for the stop member 23 that is pivotable about the axis of rotation 26 of the deflection roller 18. The forces that are transmitted from the bale-forming device 2 onto the deflection roller 18 are guided through the stop member 23 and the abutment 24 as well as the tensioning arm 19 directly into the housing; this ensures an especially stable support. Accordingly, a pressing force is exerted that avoids additional bending moments in the tensioning arm 19. In this way, a prerequisite is provided for designing important parts of the machine in a weight-reduced and material-saving way.

Figure 7:
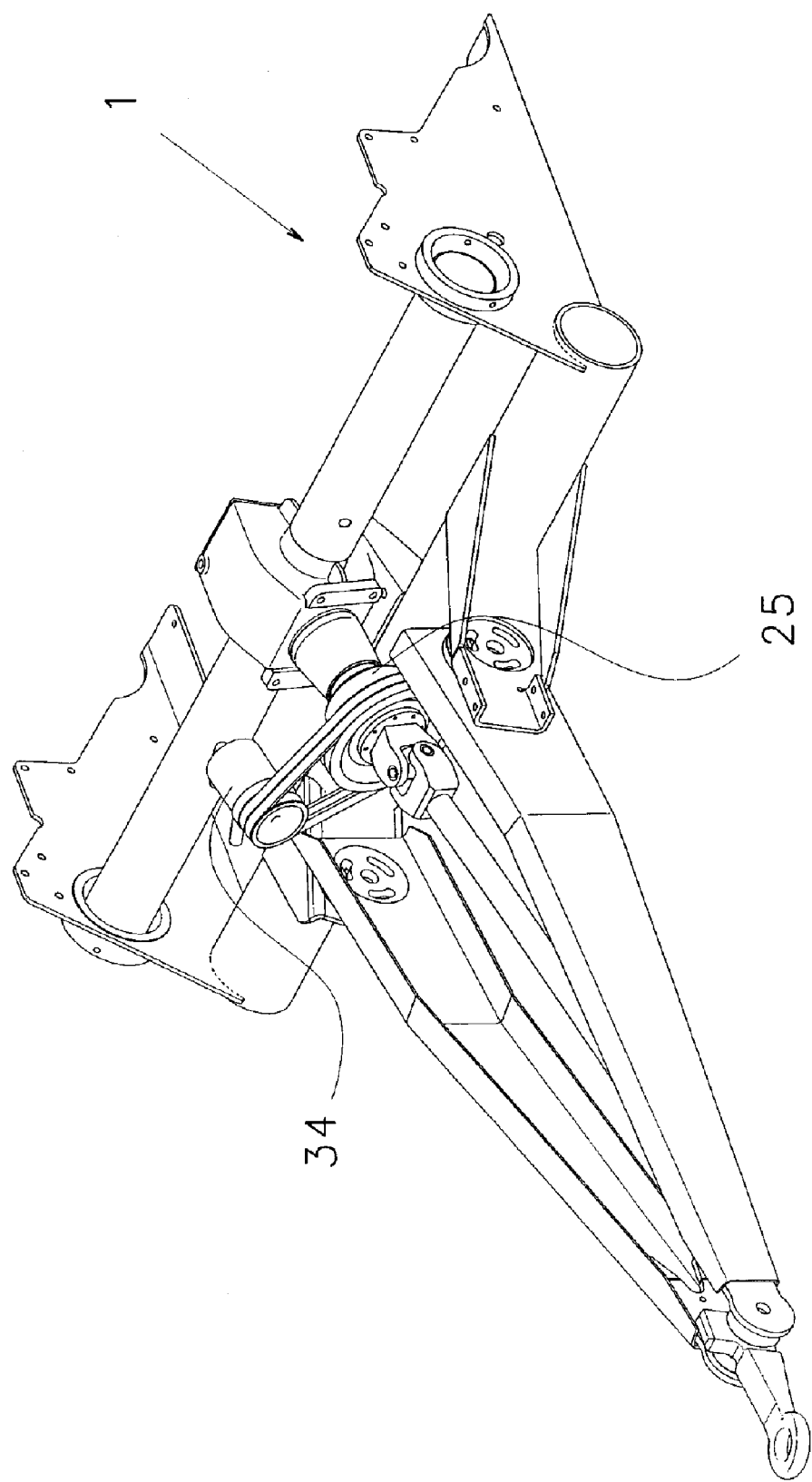
FIG. 7 shows schematically an additional hydraulic pump for opening the winding chamber of the machine.

FIG. 7 shows an embodiment in which, in accordance with an alternative drive solution, it is possible to keep operative, in the case of a drive overload, the machine 1 for taking up (collecting) and pressing an agricultural harvest (harvested material or crop) that is provided with an onboard hydraulic pump 34. By means of a drive belt pulley that is mounted on the exterior housing of an overload protection device 25 and that continues to rotate in an overload situation, the hydraulic pump 34 is continued to be supplied with mechanical drive energy even in an overload situation.

While specific embodiments of the invention have been shown and described in detail to illustrate the inventive principles, it will be understood that the invention may be embodied otherwise without departing from such principles.

What is claimed is:

1. A machine for collecting and pressing a crop to roll-shaped bales, the machine comprising:
   a crop collecting device;
   a bale-forming device defining a winding chamber that is arranged downstream of the crop collecting device and adapted to be opened;
   wherein the bale-forming device is adapted to be transported on a chassis;
   a first and a second stationary deflection devices, wherein the bale-forming device is guided about the at least first and second stationary deflection devices and wherein the bale forming device has a load run extending from the first stationary deflection device to the second stationary deflection device and a return run extending from the second stationary deflection device to the first stationary deflection device;
   stationary guides positioned along the load run between the first and second stationary deflection devices;
   wherein the load run of the bale-forming device, during a first bale-forming phase, travels along a spatially determined movement path that is determined by the stationary guides on which stationary guides the load run is supported during the first bale-forming phase;
   wherein the load run of the bale-forming device is lifted off the stationary guides during a second bale-forming phase by a growing bale diameter of a bale that is being formed during the second bale-forming phase; and
   wherein, for compressing the bale formed during the second bale-forming phase after the bale has reached a preset bale diameter, the bale-forming device exerts on the bale in a compression phase a compression force in a direction from the exterior to the interior of the bale.

2. The machine according to claim 1, wherein the stationary guides are stationarily mounted on sidewalls of the machine.

3. The machine according to claim 2, wherein the sidewalls have first sidewall sections that laterally secure the bale to be formed during the first bale-forming phase and have second sidewall sections that are spaced from the bale to be formed during the second bale-forming phase.

4. The machine according to claim 2, wherein the sidewalls have an inwardly projecting step forming a support for the stationary guides and wherein inwardly positioned sidewalls sections of the sidewalls provide a lateral guiding action for the bale to be formed during the first bale-forming phase.

5. The machine according to claim 4, wherein the stationary guides are deflection rollers stationarily supported on the step.

6. The machine according to claim 1, wherein the bale-forming device is adapted to be transferred from a first spatially determined movement path during the first bale-forming phase to additional movement paths during the second bale-forming phase up to a final movement path matching a preset adjustable diameter of the bale to be formed, wherein the additional movement paths are independent of the stationary guides and are determined by the diameter of the bale to be formed, and wherein the adjustable diameter is adjusted by moveable control means and, after reaching the preset adjustable diameter, the compression force is applied by the bale-forming device to the bale to be formed.

7. The machine according to claim 6, wherein the control means comprise a stop member interacting with an abutment.

8. The machine according to claim 7, wherein the stop member is arranged on a housing of the machine.

9. The machine according to claim 6, wherein the control means are pivotable.

10. The machine according to claim 1, wherein the bale-forming device comprises crossbars having ends secured on belts.

11. The machine according to claim 1, wherein the first and second stationary deflection devices are stationary upper and lower deflection rollers within the winding chamber, wherein the lower deflection roller is arranged immediately adjacent a conveying element of the crop collecting device.

12. The machine according to claim 11, wherein the conveying element is arranged relative to the lower deflection roller such that the crop is transported from above onto the bale-forming device that is reversed at the lower deflection roller.

13. The machine according to claim 1, wherein the spatially determined movement path during the first bale-forming phase is guided on the stationary guides and sidewall sections of the machine such that a bale-starting chamber is defined that is polygonal but cicular in approximation.

14. The machine according to claim 13, wherein the bale-starting chamber is triangular, quadrangular or pentagonal.

15. The machine according to claim 13, wherein the stationary guides are arranged outside of the sidewall sections defining the bale-starting chamber.

16. The machine according to claim 13, wherein the bale-forming device comprises crossbars having ends secured on belts, wherein the crossbars have a length greater than a width of the bale-starting chamber between the sidewall sections.

17. The machine according to claim 1, further comprising measuring elements for measuring a bale parameter, wherein the measuring elements are activated when the bale-forming device begins the compression phase.

18. The machine according to claim 1, comprising an overload protection device for a drive of the machine and a hydraulic pump configured to operate independently of the overload protection device, wherein in an overload situation the hydraulic pump is adapted to open the winding chamber.

19. The machine according to claim 1, wherein the bale-forming device is supported on a yielding deflection roller that is loadable by a force storage device.

* * * * *